(12) United States Patent
Hatanaka et al.

(10) Patent No.: US 8,030,917 B2
(45) Date of Patent: Oct. 4, 2011

(54) OVER ONE TURN ROTATION ANGLE SENSOR USING ROTATING MAGNETIC FIELD

(75) Inventors: Shinji Hatanaka, Okazaki (JP); Kenji Takeda, Okazaki (JP); Shigetoshi Fukaya, Toyota (JP)

(73) Assignees: Nippon Soken, Inc., Nishio, Aichi-Pref. (JP); Denso Corporation, Kariya, Aichi-Pref. (JP)

( * ) Notice: Subject to any disclaimer, the term of this patent is extended or adjusted under 35 U.S.C. 154(b) by 334 days.

(21) Appl. No.: 12/331,920

(22) Filed: Dec. 10, 2008

(65) Prior Publication Data
US 2009/0146651 A1    Jun. 11, 2009

(30) Foreign Application Priority Data

Dec. 11, 2007  (JP) ................................ 2007-319796
May 27, 2008   (JP) ................................ 2008-137977

(51) Int. Cl.
*G01B 7/30* (2006.01)
*G01P 3/00* (2006.01)

(52) U.S. Cl. ............ 324/207.25; 324/207.11; 73/514.39

(58) Field of Classification Search ........................ None
See application file for complete search history.

(56) References Cited

U.S. PATENT DOCUMENTS

| | | | |
|---|---|---|---|
| 6,501,265 B2 * | 12/2002 | Nakamura et al. | 324/207.2 |
| 6,861,837 B1 | 3/2005 | Shimizu et al. | |
| 6,894,487 B2 | 5/2005 | Kunz-Vizenetz | |
| 6,940,275 B2 * | 9/2005 | Sogge | 324/207.2 |
| 7,233,139 B2 * | 6/2007 | Kitanaka et al. | 324/207.12 |
| 7,285,952 B1 * | 10/2007 | Hatanaka et al. | 324/207.25 |
| 2004/0189288 A1 | 9/2004 | Mizutani et al. | |
| 2007/0268015 A1 | 11/2007 | Hatanaka et al. | |

FOREIGN PATENT DOCUMENTS

| | | |
|---|---|---|
| JP | 2004-317486 | 11/2004 |
| JP | 2005-003625 | 1/2005 |
| JP | 2007-256250 | 10/2007 |
| JP | 2007-263585 | 10/2007 |
| JP | 2007-309681 | 11/2007 |

OTHER PUBLICATIONS

Japanese Office Action dated Nov. 26, 2009, issued in corresponding Japanese Application No. 2008-137977, with English translation.

* cited by examiner

*Primary Examiner* — Vinh Nguyen
(74) *Attorney, Agent, or Firm* — Nixon & Vanderhye PC

(57) ABSTRACT

A pair of cylindrical magnets with cut away portions has been arranged on both sides of a magnetic sensing element in symmetry of rotation, and a yoke surrounds the magnetic sensing element in contact with outer peripheral surfaces of the pair of the cylindrical magnets with cut away portions. The pair of the cylindrical magnets with cut away portions rotates around an axial center with a concurrent axial displacement along with a rotation of a rotating body. The pair of the cylindrical magnets with cut away portions is arranged in inclined manner against an axis-of-rotation of the magnet. Thereby, the rotation and the displacement in the direction of the axis against the magnetic sensing element of the pair of the cylindrical magnets with cut away portions, and the number of times of rotation can be detected by detecting the size of the magnetic flux density by the magnetic sensing element. The pair of the cylindrical magnets with cut away portions improves the size and linearity of the magnetic field on the axial center.

6 Claims, 9 Drawing Sheets

FROM 6 → | 100 | → OUTPUT

----> FLOW OF MAGNETIC FLUX

----> FLOW OF MAGNETIC FLUX

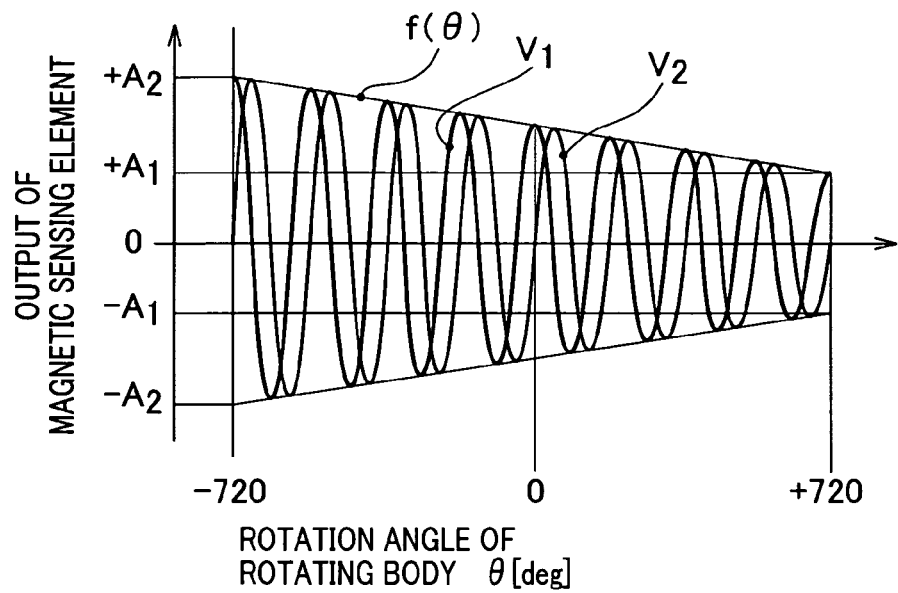
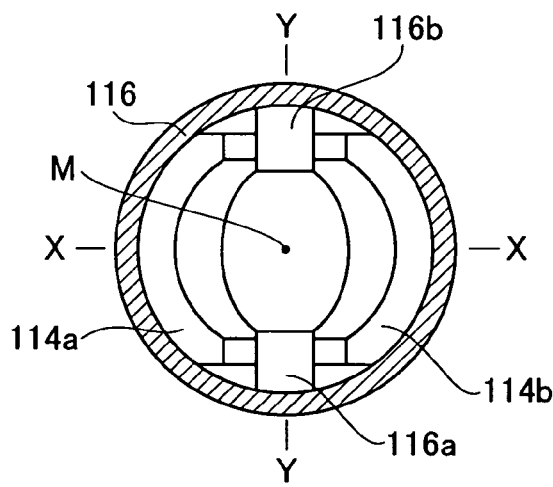
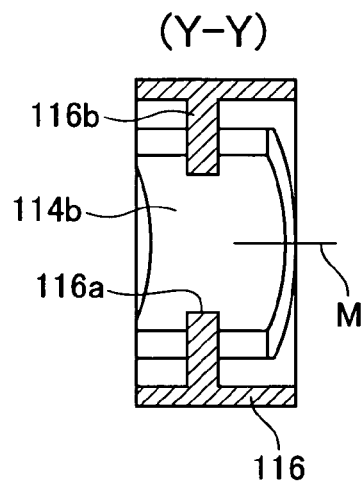
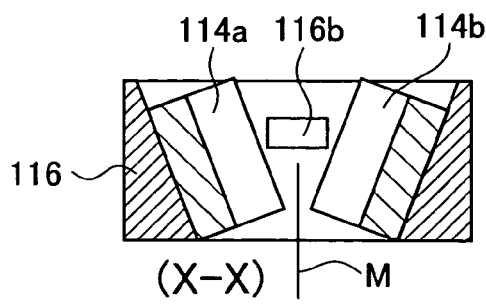

WITHOUT PROJECTED PORTIONS

WITH PROJECTED PORTIONS

OVER ONE TURN ROTATION ANGLE SENSOR USING ROTATING MAGNETIC FIELD

CROSS-REFERENCE TO RELATED APPLICATION

This application is based on and claims the benefit of priority from earlier Japanese Patent Application Nos. 2007-319796 and 2008-137977 filed Dec. 11, 2007 and May 27, 2008, respectively, the descriptions of which are incorporated herein by reference.

BACKGROUND OF THE INVENTION

1. Technical Field of the Invention

The present invention relates to an improvement of a rotation angle sensor that detects an angle of rotation of a rotary shaft by detecting the rotation of a magnetic field vector caused by the rotation of the rotary shaft.

2. Description of the Related Art

Steering angle sensors utilizing a rotation angle sensor are known. Such a rotation angle sensor detects the change in the angle of rotation of a magnet (including a polarized body), using a magnetic sensing element.

Japanese Patent Laid-Open Publication No. 2005-003625 and U.S. Pat. No. 6,894,487 each disclose this type of rotation angle sensor that uses a sensor that can detect an angle of rotation greater than 360 degrees (hereinafter also referred to as an "over-360 degrees rotation sensor") of a rotary shaft whose angle of rotation is to be detected. The term "over-360 degree rotation sensor" refers to a sensor that detects the total number of degrees of revolution that the rotary shaft has undergone. For example, on the first revolution a turn of 45 degrees from the rotation start point will be measured as 45 degrees. On the next revolution, the same position will be measured as 360+45 degrees, i.e. 405 degrees.

U.S. Pat. No. 6,894,487 suggests an over-360 degrees rotation sensor having a structure in which a magnet is rotated while being concurrently moved in the axial direction. A magnetic sensor that is disposed axially close to the magnet determines the angle of rotation based on the direction of the magnetic flux density and determines the $N^{th}$ rotation (where N represents the number of complete rotations that have occurred since rotation started) based on the intensity of the magnetic flux density.

In addition, Japanese Patent Laid-Open Publication No. 2007-256250 filed by the applicant of the present invention suggests an over-360 degrees rotation sensor having a structure in which a cone taper surface of a cylindrical magnet having an inner peripheral surface with a cone tapered surface (it is also simply called a coned surface) is magnetized so that the N pole and S pole are formed separately at 180 degrees mutually onto the cone taper surface. When the cone taper surface is rotated around a magnetic sensing element while being concurrently moved in the axial direction, the magnetic sensor determines the $N^{th}$ rotation based on the intensity of the magnetic flux density.

In the over-360 degrees rotation sensor suggested in Japanese Patent Laid-Open Publication No. 2005-003625, two magnet shafts independently engage with a single rotary shaft whose angle of rotation is to be detected. The angles of rotations of the two magnet shafts are detected by two respective magnetic sensing elements.

The two magnetic sensing elements are adapted to generate outputs having different phase angles. A signal processing unit then calculates an angle of rotation over 360 degrees based on the difference between the phase angles of the two outputs.

The over-360 degrees rotation sensor of this literature can detect an angle of rotation over 360 degrees. However, this sensor is required to arrange two sets of gear mechanisms, magnets and magnetic sensing elements around the rotary shaft subjected to detection.

Thus, the sensor disclosed in this literature has suffered from such problems as the increases in the number of parts and the size of the sensor, as well as the increase in the manufacturing cost.

A single-axis over-360 degrees rotation sensor explained below can mitigate these problems of the two-axis over-360 degrees rotation sensor.

In the over-360 degrees rotation sensor suggested in U.S. Pat. No. 6,894,487, there was a problem that separating the magnetic flux affecting the magnetic sensing element and an external noise in the magnetic field is not easy, and signal to noise ratio (S/N ratio) is poor.

In the over-360 degrees rotation sensor suggested in Japanese Patent Laid-Open Publication No. 2007-256250, although the circumference of the magnetic sensing element is surrounded by the magnet or the yoke, the influence of the external noise in the magnetic field may be reduced and the detection accuracy may be improved, the manufacturing and magnetization processes become complicated because the inner peripheral surface of the magnet is the cone tapered surface, and many magnet material may be consumed.

In addition, there is a problem that it is easy to cause a crack in the magnet because the thickness in the direction of the diameter of each part of the magnet is different.

SUMMARY OF THE INVENTION

The present exemplary embodiment has been made in light of the circumstances explained above, and has as its object to provide a single-axis type over-360 degrees rotation sensor capable of improving magnetic field intensity that affects a magnetic sensing element while reducing the amount of magnet material being used.

In the rotation angle sensor according to a first aspect, there is provided a rotation angle sensor comprising a gapped magnetic circuit that rotates around an axis-of-rotation of a magnet while being concurrently moved in an axial direction interlocking with a rotation of a rotating body, a magnetic sensing element being arranged at the axis-of-rotation of the magnet having the gapped magnetism circuit that detects a magnetic field on the axis-of-rotation of the magnet, and a signal-processing unit that detects the number of rotations of the magnet based on a size of the magnetic field detected based on a signal of the magnetic sensing element by detecting an angle of rotation of the magnet detected based on the magnetic field direction detected by the signal of the magnetic sensing element.

The gapped magnetism circuit further comprises a magnet that forms the magnetic field and a yoke for strengthening the magnetic field on the axis-of-rotation of the magnet, wherein the magnet is formed cylindrically with a cut away portion and there is provided a pair of cylindrical magnets with cut away portions that are arranged facing each other with the magnetic sensing element there between, inner peripheral surfaces of the pair of cylindrical magnets with cut away portions are arranged facing to the magnetic sensing element and become polar surfaces of mutually opposite magnetic poles, the yoke is made of a soft magnetic member in a pipe form and arranged at all the circumferences of the axis-ofrotation of the magnet by surrounding the pair of cylindrical magnets with cut away portions, and the yoke delivers and receives magnetic flux to and from outer peripheral surfaces of the pair of cylindrical magnets with cut away portions.

It should be appreciated that a cylindrical magnet with the cut away portion used here has a shape of a cylindrical magnet with constant inner and outer diameters having a cut away portion of only a predetermined angle $2\alpha$ focusing on the axial center. The angle $2\alpha$ of the cylindrical magnet is 360 degrees. A suitable angle $2\alpha$ is assigned to be 60-150 degrees.

That is, the point that the pair of cylindrical magnets with a cut away portion is arranged inside the cylindrical yoke that is mutually separated 180 degrees characterizes the present exemplary embodiment. Thereby, the following effects can be demonstrated.

First, since a thickness of the magnet is fixed, it is hard to produce a crack at the time of compression and sintering etc., and the amount of magnet material being used can also be lessened, thus magnet cost can be reduced.

Next, when the pair of cylindrical magnets with a cut away portion is used, it turns out that the magnetic field intensity given to the magnetic sensing element arranged at the axis-of-rotation can be increased compared with a cone tapered or a cylindrical magnet.

The inventor surmises that magnetic field in the axial direction is reduced due to the cut away and removed portion, when the magnet is changed into a cylindrical magnet with a cut away portion.

In the present exemplary embodiment, a pair of cylindrical magnets with a cut away portion reduces the magnet field minimum value during rotation and produces a stronger signal intensity from the magnetic sensing element. A point about this will be mentioned later.

In the rotation angle sensor according to a second aspect, the pair of the cylindrical magnets with cut away portions is inclined to the axis of rotation such that one end is close to the axis of rotation than the other. The distance from the sensor to the magnet surface changes due to the rotation of the magnet and simultaneous axial motion of the magnet.

In the rotation angle sensor according to a third aspect, intensity of the magnetic field on the axis-of-rotation of the magnet is continuously changed in the direction of the axis-of-rotation of the magnet by a magnetic reluctance of the gap provided between the outer peripheral surfaces of the pair of cylindrical magnets with cut away portions and the yoke.

In the rotation angle sensor according to a fourth aspect, wherein a size of the gap provided between the outer peripheral surfaces of the pair of the cylindrical magnets with cut away portions and the yoke is continuously changed in the direction parallel to the axis-of-rotation of the magnet.

In the rotation angle sensor according to a fifth aspect, wherein there are provided projected portions made of soft magnetic material that are located between the pair of cylindrical magnets with cut away portions, and project from the inner peripheral surface of the yoke to the direction inside of its diameter, the projected portions have the form that continuously changes the size of the magnetic field of each part on the axis-of-rotation of the magnet.

In a preferred embodiment, two magnetic sensing elements are used, which are located perpendicular to each other. The angle of rotation of the cylindrical magnet with a cut away portion against the magnetic sensing elements is detected based on the ratio of the signals detected by the two magnetic sensing elements.

Specifically, the magnetic field acting on the two magnetic sensing elements in a static condition sinusoidally changes as the cylindrical magnet with a cut away portion is rotated. In the end, an angle of rotation $\theta$ of 360 degrees or less is calculated from an "arctan" value that is a detected angle of the cylindrical magnet with a cut away portion. The calculated value is then added to a value of "number of rotation $\theta$ of 360 degrees" to calculate a final angle of rotation of the cylindrical magnet with a cut away portion, the resultant of which may then be substituted for the angle of rotation of the rotating body (which angle is also referred to as a "turn angle").

As to the signal processing required, refer to Japanese Patent Laid-Open Publication Nos. 2007-256250, 2007-263585 and 2007-309681, filed by the applicant of the present invention.

In the rotation angle sensor according to a sixth aspect, wherein the pair of cylindrical magnets with cut away portions are formed of soft magnetic material and have a pair of projected portions that project individually from the inner peripheral surface of the yoke towards openings made between the pair of cylindrical magnets with cut away portions.

In the rotation angle sensor according to a seventh aspect, the yoke is cut and bent to form the pair of projected portions.

BRIEF DESCRIPTION OF THE DRAWINGS

In the accompanying drawings:

FIG. 19 is a waveform chart showing the relation between the output of the device and a rotation angle of FIG. 18;

FIG. 20A is a sectional view in the direction of the diameter showing the inside of the yoke of the device of FIG. 18.

FIG. 20B is an axial cross-sectional view (in the direction of Y-Y) showing the inside of the yoke of the device of FIG. 18;

FIG. 20C is an axial cross-sectional view (in the direction of X-X) showing the inside of the yoke of the device of FIG. 18;

With reference to the accompanying drawings, hereinafter will be described some embodiments of a steering angle sensor to which a rotation angle sensor of the present invention is applied.

It should be appreciated that the present invention is not limited to the embodiments provided below, but the technical idea of the present invention may be realized in combination with other techniques.

FIRST EMBODIMENT (Configuration)

Figure 1:
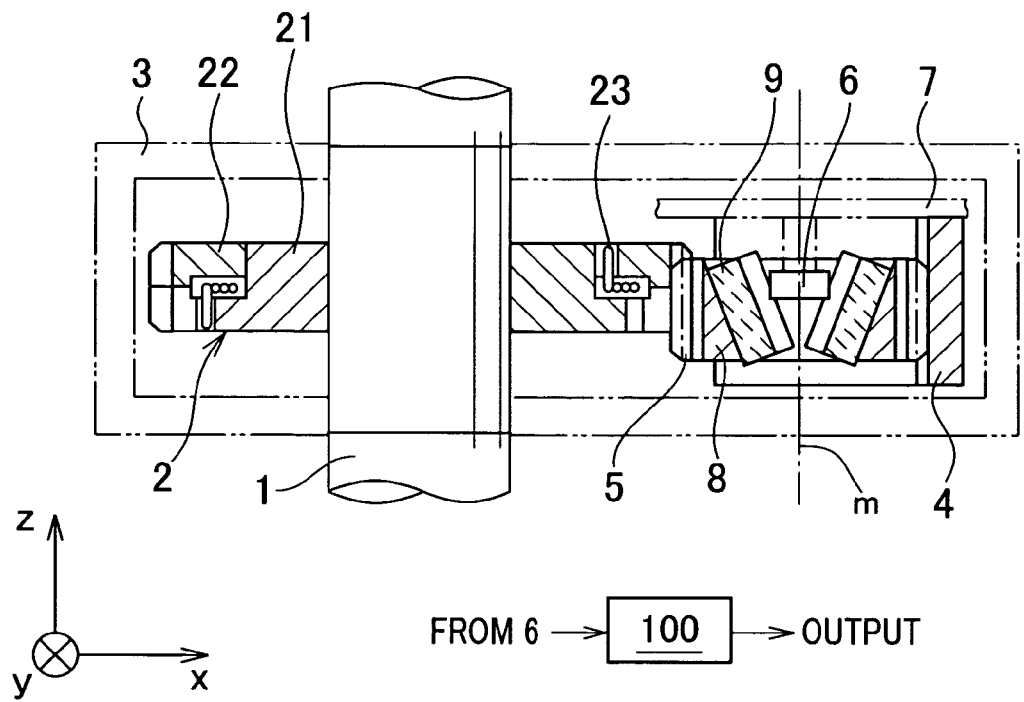
FIG. 1 is a schematic axial cross-sectional view illustrating a steering angle sensor according to a first embodiment of the present invention.
Figure 2:
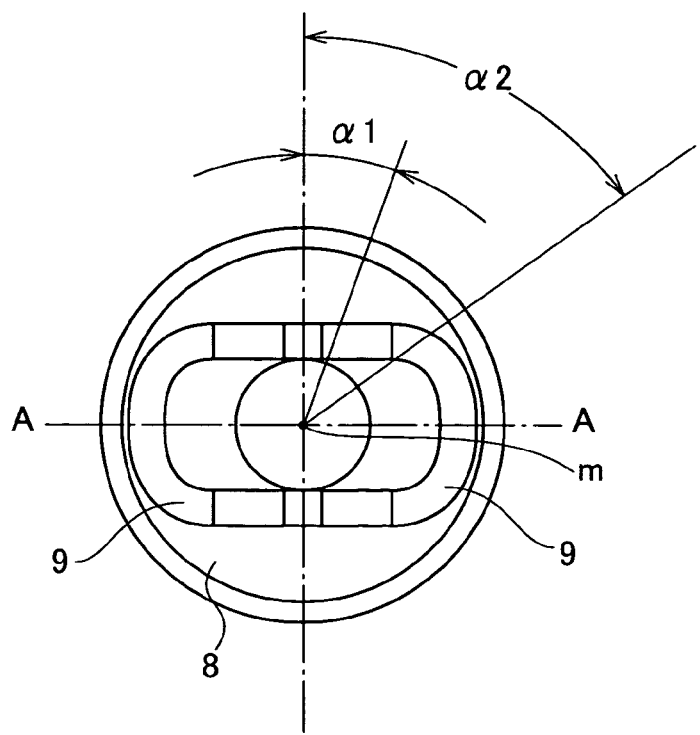
FIG. 2 is a plane view of a yoke and a pair of cylindrical magnets with a cut away portion shown in FIG. 1.

Referring to FIGS. 1 and 2, hereinafter is described a steering angle sensor according to a first embodiment. FIG. 1 is a schematic cross-sectional view illustrating the sensor, and FIG. 2 is a plane view illustrating a yoke 8 viewed from the top to a direction of an axial center of magnets "m", and a pair of cylindrical magnets 9 with a cut away portion.

The steering angle sensor is a sensor for detecting an angle of rotation of a rotating body 1 that configures a steering shaft. The rotating body 1 is fixed with a driving gear 2 serving a scissors gear. The rotating body 1 is disposed passing through a housing 3.

A screw receiver 4 is fixed to an area of an inner peripheral surface of the housing 3. A driven gear 5 is disposed being engaged with the driving gear 2 and the screw receiver 4. A magnetic sensing element 6 is disposed being vertically hung from the housing 3 toward an axis "m" (in the present exemplary embodiment, an axial center of magnets) of the driven gear 5.

The sensor also includes a circuit board 7 on which an electronic circuit, i.e. a signal-processing unit 100, of the present invention is mounted.

The driving gear 2 is made up of a scissors gear which is a so-called "non-backlash gear". The details of the driving gear 2 will be described later.

The screw receiver 4 has a cylindrical body having a substantially cylindrical shape with a cut away portion extending in the axial direction The screw receiver 4 having the cylindrical shape with the cut away portion is obtained by axially cutting off a portion of a cylindrical body by a predetermined angular width, the cylindrical body having an inner peripheral surface in which a spiral thread face is formed.

Accordingly, the spiral thread face formed in the inner peripheral surface of the screw receiver 4 is also has a cylindrical shape with a cut away portion.

The driven gear 5 is interposed between the rotating body 1 and the screw receiver 4, with its axis m being positioned on an imaginary linear line connecting the axis of the rotating body 1 and the circumferential center of the screw receiver 4. The driven gear 5 is engaged with the driving gear 2, i.e. a scissors gear. In addition, the driven gear 5 has tooth tips, each of which is formed with a thread groove for engagement with the thread face of the screw receiver 4 with a cut away portion. The driven gear 5 is rotatably arranged at an upper surface of a bottom portion of the housing 3.

A cylindrical yoke 8 is fixed to the inner peripheral surface of the cylindrical driven gear 5, and a pair of cylindrical magnets 9 with a cut away portion are separated in 180 degrees each other and inserted and fixed into the inner peripheral surface of the yoke 8 made of soft iron.

The portion touching to the outer peripheral surface of the pair of the cylindrical magnets 9 with cut away portions among inner peripheral surface of the yoke 8 forms a partial cylindrical surface.

Although the inner peripheral surface of the cylindrical yoke 8 is shaped as shown in FIG. 2 in the present embodiment, if it has the shape that short circuits magnetically between a pair of outer peripheral surfaces of the cylindrical magnets 9 with a cut away portion and surrounds all the circumference of the magnetic sensing element 6, the shape of the inner peripheral surface of the cylindrical yoke 8 may have other various shapes.

The pair of cylindrical magnets 9 with cut away portions are fixed to the yoke 8 with the inclination posture in which the bottom end of it in the direction of the axis approaches the axis-of-rotation "m" of the magnet rather than the top end of it in the direction of the axis.

Further, the thickness in the direction of the diameter of the pair of cylindrical magnets 9 with cut away portions is set to be constant.

Furthermore, the pair of cylindrical magnets 9 with cut away portions has a shape where only angle 2α is cut out from the cylindrical magnet parallel to the axial center thereof.

It should be appreciated that the yoke 8 and the driven gear 5 may be formed integrally.

The pair of cylindrical magnets 9 with cut away portions are magnetized in a predetermined direction (the direction of A-A shown in FIG. 2) in the direction of its diameter, as shown in FIG. 2, and as a result, the inner peripheral surfaces of the pair of cylindrical magnets 9 with cut away portions become polar surfaces with opposite magnetic poles.

Specifically, the inner peripheral surface of the top of cylindrical magnets 9 with a cut away portion in FIG. 2 becomes an S pole, and the inner peripheral surface of the bottom of cylindrical magnets 9 with a cut away portion in FIG. 2 becomes an N pole.

Thereby, the magnetic field "B" in the direction of A-A is formed in the axial center "m" in the orthogonal direction (the direction of the diameter) to the axial center "m".

The cylindrical yoke 8 magnetically short-circuits the outer peripheral surface of the pair of cylindrical magnets 9 with cut away portions while it cuts off external magnetic field noise.

The magnetic sensing element 6 is arranged at the axial center "m".

The magnetic sensing element 6 consists of a pair of Hall elements that detect the components of the magnetic field in the directions of "X" and "Y" that intersect mutually in the direction perpendicular (the direction of its diameter) to the axial center "m". That is, the 1st Hall element outputs a signal voltage proportionate to the X-direction magnetic flux density component Bx, and the 2nd Hall element outputs a signal voltage proportionate to the Y-direction magnetic flux density component By.

The magnetic field (it is also called a magnetic field of the magnet) that the pair of the cylindrical magnets 9 with cut away portions forms in the axial center becomes a vector sum of the X-direction magnetic flux density component Bx and the Y-direction magnetic flux density component By.

The magnetic sensing element 6 has a circuit that amplifies the output signal of these two Hail devices, and outputs a signal voltage Vx proportional to the X-direction magnetic flux density component Bx, and the signal voltage Vy proportional to the Y-direction magnetic flux density component By.

(Operation)

Hereinafter is described an angle of rotation sensing operation of the sensor described above.

When the driving gear 2 rotates with the rotating body 1, the driven gear 5 in engagement with the driving gear 2 is rotated. Being in engagement with the screw receiver 4, the driven gear 5 is axially displaced while being concurrently rotated.

With rotation of the rotating body 1, the pair of polarized areas, i.e., the N pole surface and S pole surfaces rotate, while at the same time, the radial distance between each of the pair of polarized areas and the magnetic sensing element 6 successively changes.

As a result, with rotation of the rotating body 1, the direction and the intensity of the magnetic field (which may be considered as being magnetic flux having certain density) radially passing through the magnetic sensing element 6 is successively altered.

When a rotation angle of the permanent magnet 9 pair is "θ" against the A-A direction, the X-direction magnetic flux density component Bx and the Y-direction magnetic flux density component By imparted to the magnetic sensing element 6 by the pair of the cylindrical magnets 9 with cut away portions are expressed as follows.

$$Bx = f(\theta)\cos\theta$$

$$By = f(\theta)\sin\theta$$

It should be appreciated that f(θ) is a function that indicates the change in a vector length L of the magnetic flux B at the position of the magnetic sensing element 6, which change is caused by axial displacement of the magnet pair 9. The function value f(θ) is determined, for example, by the shapes and the materials of the magnet and the yoke.

A signal processing unit 100 stores the relationship between the function value f(θ) indicative of the vector length L of the flux density B and the number of rotations of a magnet rotation axis.

The signal-processing unit 100 has a function of conducting inverse tangent calculation for the flux density components Bx and By inputted from the magnetic sensing element 6. As a result of the inverse tangent calculation, a relation expressed by:

$$\theta = \arctan(By/Bx)$$

is obtained. Thus, angular information within 360 degrees of the permanent magnet 9 can be obtained from the rotation angle θ. Further, the signal-processing unit has a function of calculating a square root of, sum of the squared flux density components Bx and By. Using this calculation, the vector length L of the magnetic flux B can be obtained.

Based on the function value f(θ) indicative of the vector length of the magnetic flux B and the relationship stored in the processing unit, the number of rotations of the magnet rotation axis is calculated.

In other words, in the present embodiment, calculation is made as to the $N^{th}$ rotation starting from the axial reference position based on the value f(θ), calculation is made as to the present-time rotation angle θ based on the value of arctan (By/Bx), and calculation is made as to a rotation angle θ' of 360 degrees or more based on the values derived from the foregoing calculations.

For example, if the second rotation is being made currently, and the rotation angle θ is 55 degrees, the final rotation angle θ' is calculated as being 415 degrees (360 degrees+55 degrees) and outputted.

Figure 3:
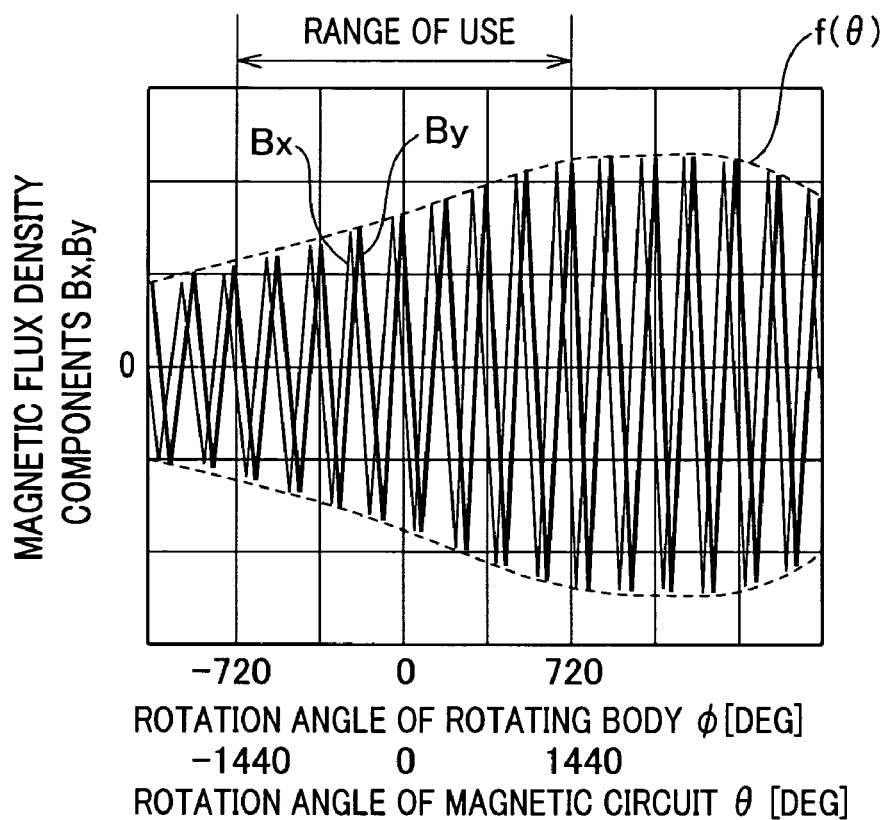
FIG. 3 shows a relation between a rotation angle "ϕ" of a rotating body, rotation angle "θ'" of the pair of cylindrical magnets with a cut away portion, and X-direction magnetic flux density component "Bx" and Y-direction magnetic flux density component "By"

FIG. 3 shows a relationship between the rotation angle φ of the rotating body 1, the rotation angle θ' of the pair of the cylindrical magnets 9 with cut away portions, and the flux density components Bx and By at the position of the magnetic sensing element 6.

Specifically, according to the present embodiment, an angle of rotation of 360 degrees or more can be detected using one set of rotating angle assembly, by rotating the pair of the cylindrical magnets 9 with cut away portions with the concurrent axial displacement of the magnet.

(Explanation on the Driving Gear 2)

Referring now to FIG. 1, hereinafter is provided a more detailed explanation on the driving gear 2.

The drive gear 2 includes a first gear 21 fitted and fixed to the rotating body 1, a second gear 22 disposed being axially adjacent to the first gear 21, and a coil spring 23. The second gear 22 is loosely fitted to the rotating body 1 or the first gear 21, while being elastically biased in one circumferential direction with respect to the first gear 21 by the coil spring 23.

The first and second gears 21 and 22 have the same number of teeth and substantially the same shape, and sandwich the driven gear 5 there between.

Thus, the coil spring 23 elastically biases the second gear 22 in the direction opposite to the direction of the torque (direction of rotation) of the driving gear 2, so that the resultant force is applied to the teeth of the driven gear 5 in the radially inward direction.
The resultant force is transferred to the screw receiver 4 via the driven gear 5 which can be displaced within the radial plane. As a result, the backlash is eliminated from between a spiral thread face in each tooth tip of the driven gear 5 and the spiral thread face of the screw receiver 4.

The pair of the cylindrical magnets 9 with cut away portions is fixed to the yoke 8. The cut away portions are inclined to the axis-of-rotation "m" of the magnet such that one end is closer to the axis-of-rotation "m" of the magnet than the other.

Further, the thickness in the direction of the diameter of the pair of cylindrical magnets 9 with cut away portions is set to be constant.

Furthermore, the pair of cylindrical magnets 9 with cut away portions has its form where only angle 2α is cut out from the cylindrical magnet parallel to the axial center thereof.

It should be appreciated that the yoke 8 and the driven gear 5 may be formed integrally.

The pair of cylindrical magnets 9 with cut away portions are magnetized in a predetermined direction (the direction of A-A shown in FIG. 2) in the direction of its diameter, as shown in FIG. 2, and as a result, the inner peripheral surface of the pair of cylindrical magnets 9 with cut away portions become oppositely polarized magnetic pole surfaces.

Specifically, the inner peripheral surface of the top of cylindrical magnets 9 with a cut away portion in FIG. 2 becomes an S pole, and the inner peripheral surface of the bottom of cylindrical magnets 9 with a cut away portion in FIG. 2 becomes an N pole.

Figure 4:
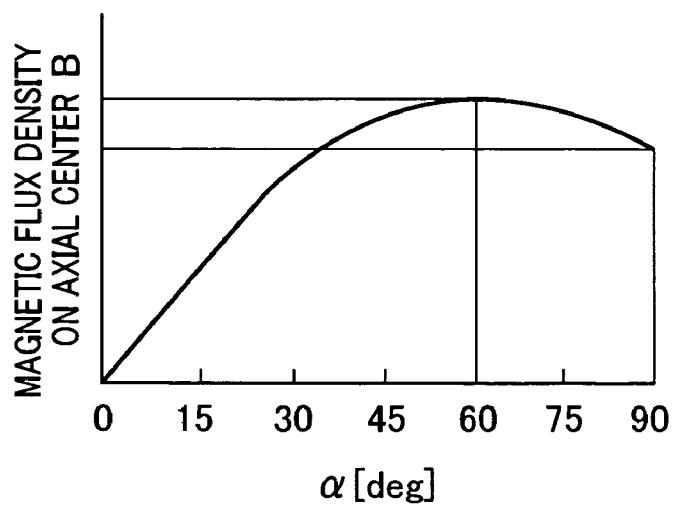
FIG. 4 is a graph showing the relationship between an angle "α" defining the geometry of the cut away portion and magnetic flux density "B" of the axial center.

The relation between the above mentioned angle α of the cylindrical magnets 9 with a cut away portion was investigated by experiment and simulation, and the magnetic flux density B on the axial center "m" is shown in FIG. 4.

When α exceeds 60 degrees, it turns out that the magnetic flux density B falls.

When α is 90 degrees, the cut away portions meet and together span 360 degrees, i.e. the magnet is a perfect cylinder.

From this, it is known that the magnetic flux density on the axial center "m" could be improved by setting α in the range of 40-60 degrees, for example, rather than a perfect cylinder type magnet.

Therefore, using the pair of cylindrical magnets 9 with cut away portions to the present embodiment can raise detection accuracy.

Figure 5:
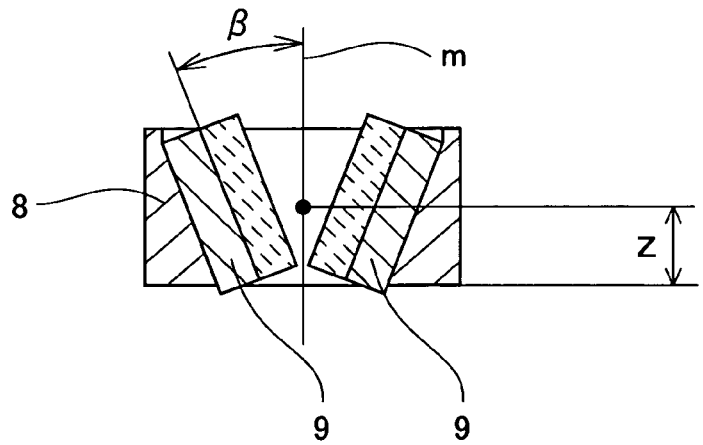
FIG. 5 is a schematic sectional view showing the angle of inclination "β" of the cylindrical magnet with a cut away portion.
Figure 6:
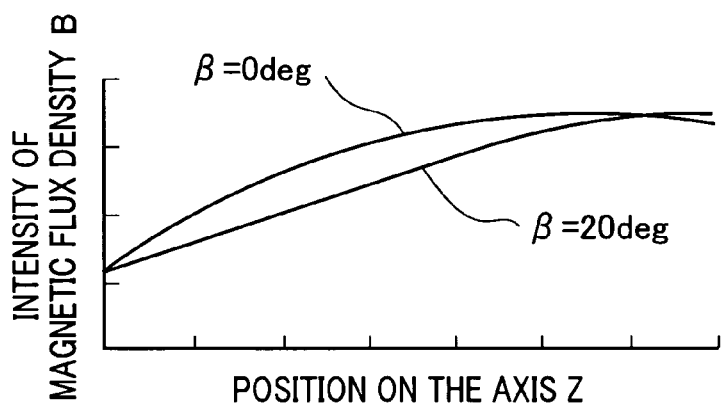
FIG. 6 is a characteristic figure showing the relation between the angle of inclination "β" and the magnetic flux density "B" on an axial center "m" in FIG. 5.

A relation between the angle of inclination β of cylindrical magnets 9 with a cut away portion investigated by experiment and simulation, and the magnetic flux density B on the axial center "m" is shown in FIGS. 5 and 6.

Since the change of the magnetic flux density B in each part on the axial center "m" is made linear when the angle of inclination β is 20 degrees as compared with the case where the angle of inclination β is 0 degrees, it was found that linearity of the output of the magnetic sensing element 6 may be improved. A letter "z" in FIG. 5 shows the distance from the magnet bottom.

That is, by arranging the pair of cylindrical magnets 9 with cut away portions in this inclined manner, the magnetic flux density at the time of displacing the magnetic sensing element 6 relative to the direction of the axial center "m" of the pair of cylindrical magnets 9 with cut away portions can be changed linearly. Thus the same effect can be acquired with having made the inner peripheral surface of the perfect cylinder type magnet into the coned taper surface.

Since the pair of cylindrical magnets 9 with cut away portions has a shape that is easy to cast, there will be no worry about cracking.

Since the yoke may use a soft magnetic object, iron for example, there is no problem regarding cracking, and it can be processed with high accuracy of dimension. Therefore, by using the yoke as a guide for arranging the magnet, the magnet can be arranged with sufficient positional accuracy.

Further, the cylindrical magnets 9 with a cut away portion in this mode are arranged in the inclined manner against the axis-of-rotation "m" of the magnet.

That is, since the distance from the magnetic sensing element 6 to the inner peripheral surface of the cylindrical magnets 9 with a cut away portion in the direction of its diameter changes with rotation of cylindrical magnets 9 with a cut away portion, a continuous change of the intensity of the magnetic field of the magnet of the magnetic sensing element 6 can be carried out in a good manner, thus the magnet rotation of over-one rotation can be detected easily with the use of the cylindrical magnets 9 with a cut away portion.

(Effect)

According to the above-mentioned embodiment, since both rotation angle detection sensitivity and linearity are improvable, the detection accuracy of the rotation angle can be improved.

MODIFICATION

Although the direction of the magnetization of the pair of the cylindrical magnets 9 with cut away portions was made into the direction of A-A in the above-mentioned embodiment, the direction of the magnetization that goes to the axial center "m" in the direction of the diameter is also acceptable.

SECOND EMBODIMENT

Figure 7A:
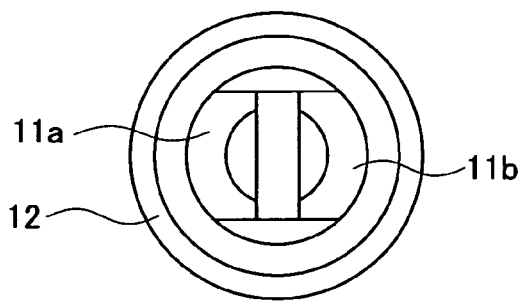
FIG. 7A is a plane view showing a structure of the yoke and the pair of cylindrical magnets with a cut away portion of a second embodiment.
Figure 7B:
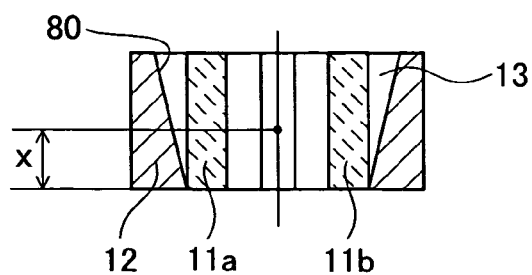
FIG. 7B is a schematic axial cross-sectional view showing the structure of the yoke and a pair of cylindrical magnets with a cut away portion of the second embodiment.

A second embodiment is explained hereafter with reference to FIGS. 7A and 7B.

The present embodiment is to arrange a pair of cylindrical magnets 11a and 11b with cut away portions, which is equivalent to the pair of the cylindrical magnets 9 with cut away portions of the first embodiment mentioned above, in parallel with the axial center "m", without being inclined, and having made the inner peripheral surface 80 of the yoke 12 in a cone tapered surface. A letter "x" in FIG. 7B shows the distance from the magnet bottom.

In addition, a pair of cylindrical magnets 11a and 11b with cut away portions should be magnetized in the direction of its diameter.

As for the feature of the present embodiment, an opening (gap) 13 is formed between the inner peripheral surface of the yoke 12 and the outer peripheral surfaces of a pair of cylindrical magnets 11a and 11b with cut away portions, and a width of the opening 13 in the direction of its diameter is in a point that increases in proportion to the increase of "x".

Figure 8A:
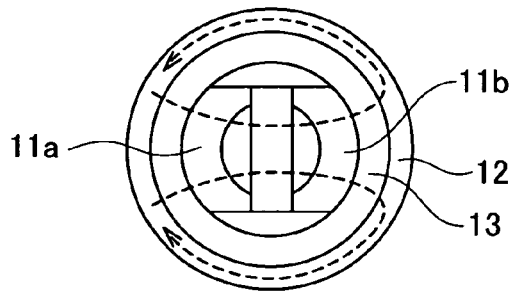
FIG. 8A is a schematic plane view of a diagram showing a magnetic flux distribution in FIG. 7.
Figure 8B:
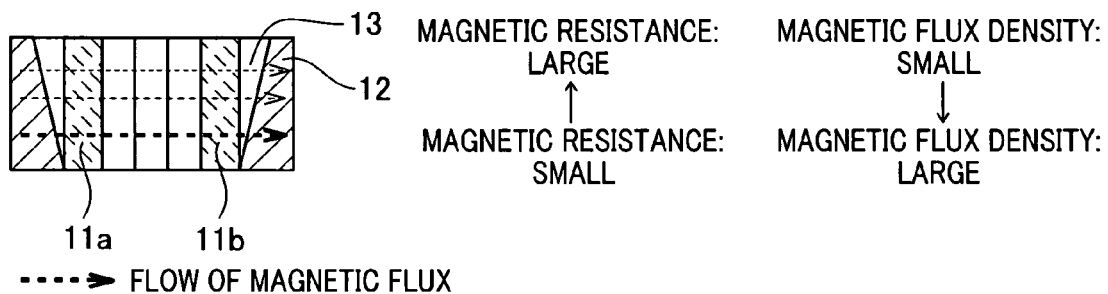
FIG. 8B is a schematic axial cross-sectional view of the diagram showing the magnetic flux distribution in FIG. 7.
Figure 9:
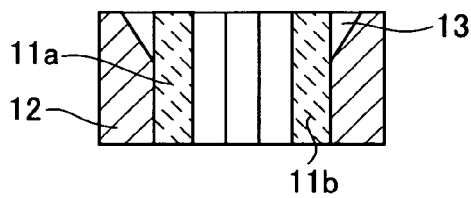
FIG. 9 is a schematic axial cross-sectional view showing the modification of the second embodiment.
Figure 10:
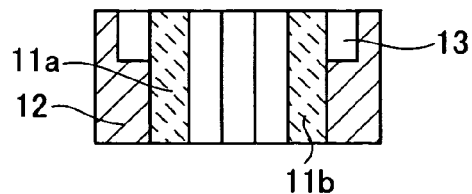
FIG. 10 is a schematic axial cross-sectional view showing the modification of the second embodiment.
Figure 11:
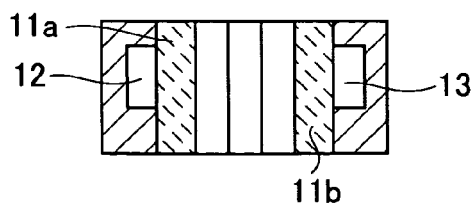
FIG. 11 is a schematic axial cross-sectional view showing the modification of the second embodiment.
Figure 12:
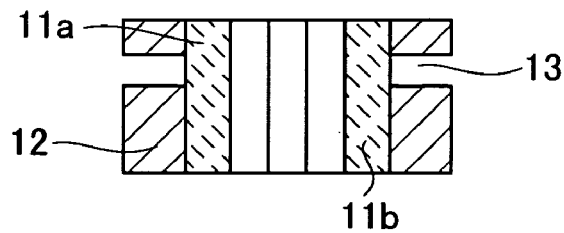
FIG. 12 is a schematic axial cross-sectional view showing the modification of the second embodiment.

If the above-mentioned condition is satisfied, the magnetic flux density B on the axial center "m" decreases along with the increase of "x" since the magnetic reluctance in the magnetic path in which a flowing magnetic flux (a dotted line shown in FIGS. 8A and 8B) that passes the upper part ("x" is large) of the axial center "m" will become larger than the magnetic reluctance in the magnetic path in which the flowing magnetic flux that passes the lower part (x is small) of the axial center "m", as shown in FIGS. 8A and 8B.

Thereby, B can be changed along with the relative rotation of a pair of cylindrical magnets 11a and 11b with cut away portions against the magnetic sensing element 6, and the number of times of rotation can be detected with sufficient accuracy. Of course, a nonmagnetic material may be placed in the opening 13.

That is, in the present embodiment, the magnetic field intensity of the magnet on the axis-of-rotation of the magnet is changed by changing the size of the opening 13 between the outer peripheral surface of a pair of cylindrical magnets 11a and 11b with cut away portions and the yoke 12 that is surrounding the opening 13 (gap) in the direction of the axis.

Thereby, it becomes possible to change the magnetic field intensity in each part of the direction of the axis of the axis-of-rotation of the magnet with a simple structure.

Further, the linearity of change of the magnetic field intensity of each part of the direction of the axis of the axis-of-rotation of the magnet can be improved with a simple structure, thus signal processing becomes easy and the distinction accuracy of the number of times of rotation can be improved.

Furthermore, it will become possible to change the magnetic field intensity of each part of the direction of the axis of the axis-of-rotation of the magnet with a simple structure.

MODIFICATION

Although the direction of the magnetization of a pair of cylindrical magnets 11a and 11b with cut away portions was made into the direction of its diameter in the above-mentioned embodiment, the direction of the magnetization that goes parallel to the axial center "m" in a right-angled plane is also acceptable.

However, the magnetic flux density on the axial center "m" can be further improved by magnetizing a pair of cylindrical magnets 11a and 11b with cut away portions in the direction of its diameter.

MODIFICATION

Other modifications are shown in FIGS. 9-12.

These modifications change the shapes of the openings 13 variously.

Even doing so, since the magnetic influence that the magnetic pole surface, which is the inner peripheral surface of a pair of cylindrical magnets 11a and 11b with cut away portions, gives each part on the axial center "m" changes according to the distance "x" of each part of the axial center "m", the same effect as the above can be acquired.

THIRD EMBODIMENT

Figure 13A:
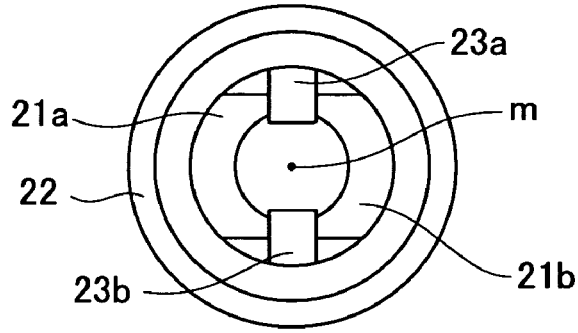
FIG. 13A is a schematic plane view of the figure showing the structure of the yoke and a pair of cylindrical magnets with a cut away portion of a third embodiment.
Figure 13C:
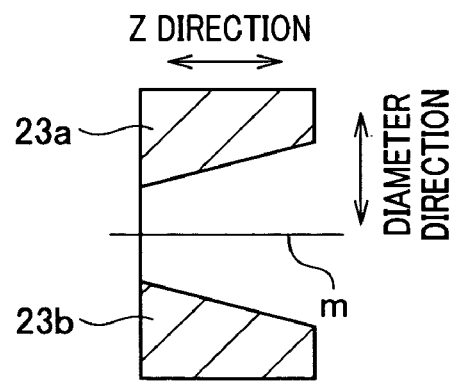
FIG. 13C is a figure showing the structure of the yoke and the pair of cylindrical magnets with a cut away portion of the third embodiment, and is the schematic axial cross-sectional view of a pair of projected portions.
Figure 13B:
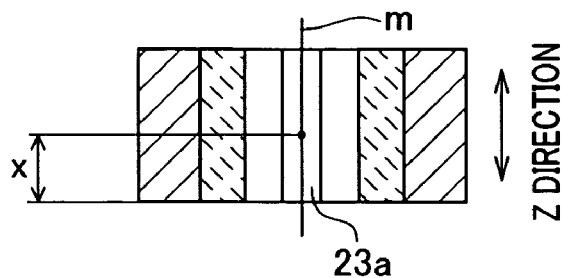
FIG. 13B is a schematic axial cross-sectional view of the figure showing the structure of the yoke and a pair of cylindrical magnets with a cut away portion of the third embodiment.

A third embodiment is explained with reference to FIGS. 13A and 13B.

The feature of the present embodiment is to arrange a pair of cylindrical magnets 21a and 21b with cut away portions in parallel with an axial center "m" and without inclination like that of the second embodiment, to stick the inner peripheral surface of the yoke 22 to the outer peripheral surface of a pair of cylindrical magnets 21a and 21b with cut away portions like that of the first embodiment 1, and to project projected portions 23a and 23b made of soft magnetism from the inner peripheral surface of the cylindrical yoke 8 in the direction to the inside of its diameter between a pair of cylindrical magnets 21a and 21b with cut away portions.

Therefore, the projected portions 23a and 23b are arranged 180 degrees apart mutually.

The projected portions 23a and 23b may be formed in the yoke 22 integrally, or may be formed separately and glued on the inner peripheral surface of the yoke 22 with a pair of cylindrical magnets 21a and 21b with cut away portions.

Figure 14A:
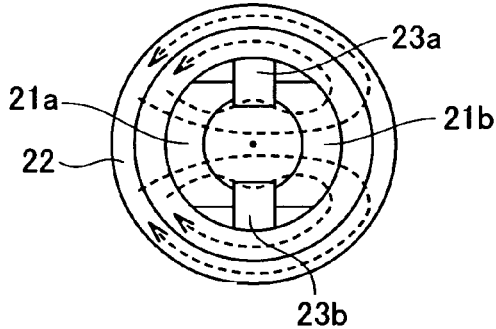
FIG. 14A is a schematic plane view of the diagram showing the magnetic flux distribution in FIG. 13.
Figure 14B:
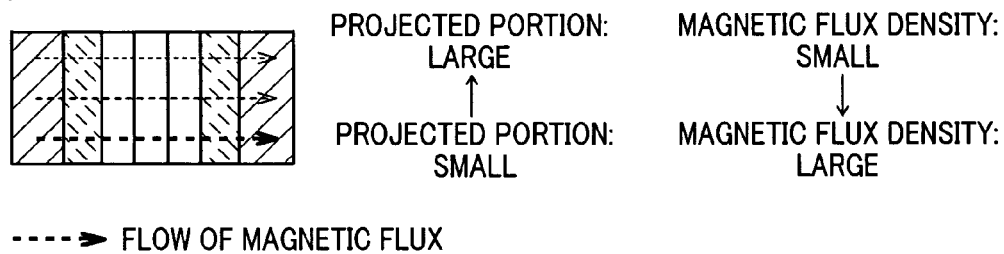
FIG. 14B is a schematic axial cross-sectional view of the diagram showing the magnetic flux distribution in FIG. 13.

By doing so, as shown in FIGS. 14a and 14b, since magnetic flux (a dotted line shown in FIGS. 14a and 14b) that flows between a pair of cylindrical magnets 21a and 21b with cut away portions is attracted by the projected portions 23a and 23b, the magnetic flux density on the axial center "m" will fall.

The fall of this magnetic flux density becomes large when the distance between a pair of projected portions 23a and 23b and the axial center "m" is small, or in another words, when "x" is small.

Therefore, also in this third embodiment, the magnetic flux density B on the axial center "m" can be changed according to the size of distance x like other embodiments mentioned already.

MODIFICATION

Figure 15A:
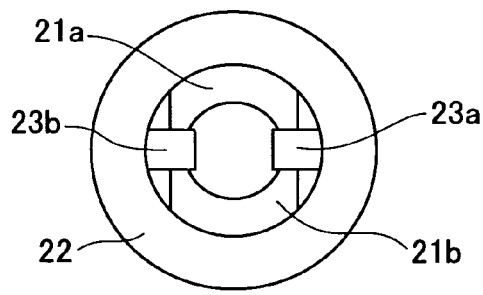
FIG. 15A is a figure showing the modification of the second embodiment, and is the schematic plane view showing the structure of the yoke and the pair of cylindrical magnets with a cut away portion.
Figure 15B:
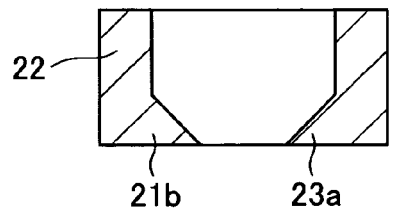
FIG. 15B is a figure showing the modification of the second embodiment, and is the axial cross-sectional view of the yoke and the pair of projected portions.
Figure 16:
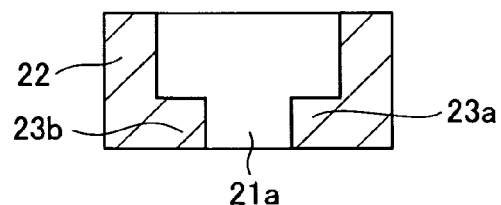
FIG. 16 is a figure showing the modification of the second embodiment, and is the axial cross-sectional view of the yoke and the pair of projected portions especially.
Figure 17:
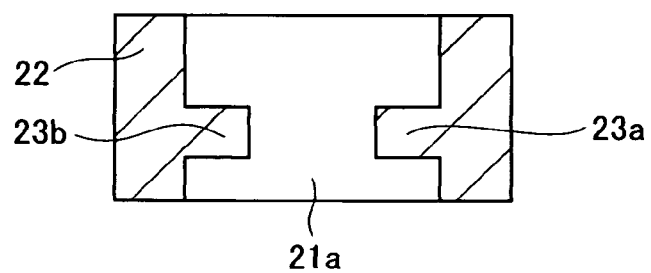
FIG. 17 is a figure showing the modification of the second embodiment, and is the axial cross-sectional view of the yoke and the pair of projected portions especially.

Other modifications are shown in FIGS. 15-17.

These modifications feature that the projected portions 23a and 23b are formed integrally with the yoke 22, and having changed various shapes of the projected portions 23a and 23b.

The size of the magnetic field of each part on the axial center "m" can be changed even if the projected portions 23a and 23b of such shapes are used.

That is, since the magnetic influence by a pair of projected portions 23a and 23b of such forms on each part on an axial center "m" changes according to the distance "x" of each part of the axial center "m", the same effect as the above can be acquired.

FOURTH EMBODIMENT

The steering angle sensor of a fourth embodiment is explained with reference to FIGS. 18-23.

(Device Composition)

Figure 18:
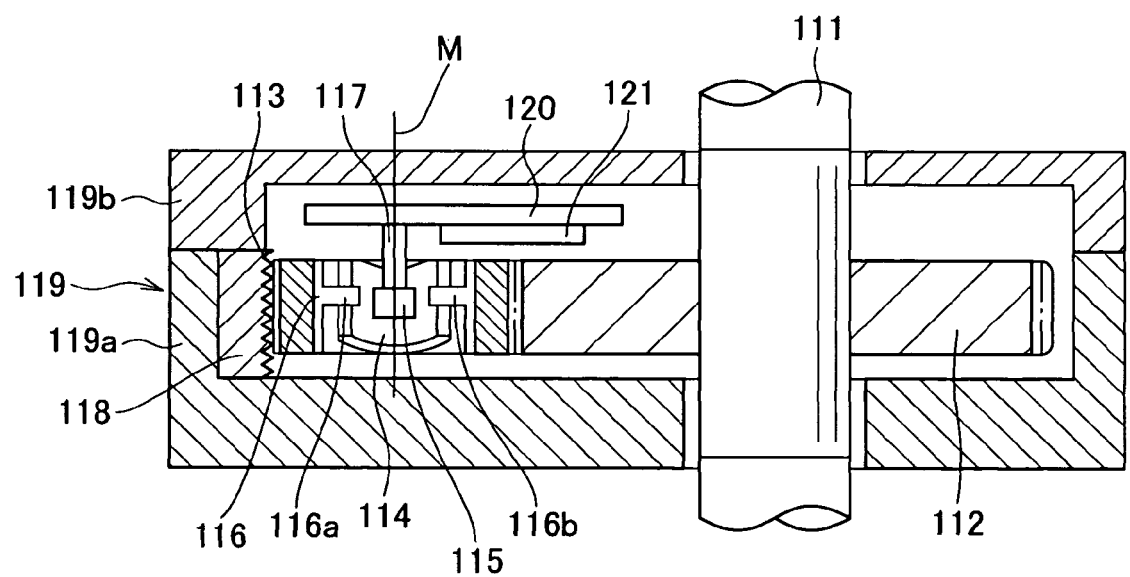
FIG. 18 is an axial cross-sectional view of the steering angle sensing device of a fourth embodiment.

FIG. 18 shows an axial cross-sectional view of the steering angle sensor.

There is provided a rotating body 111, a first gear 112 that is equivalent to the drive gear 2 shown in FIG. 1, a second gear 113 that is equivalent to the driven gear 5 shown in FIG. 1, and a permanent magnet 114 that is equivalent to the cylindrical magnet 9 with the cut away portion shown in FIG. 1. The permanent magnet 114 is fixed to the second gear 113 through a yoke 116.

A pair of permanent magnets 114 is arranged in the steering angle sensor as mentioned already, however, one of them is shown in FIG. 18.

There is further provided a magnetic sensing element 115, and the cylindrical yoke 116 that is fixed to an inner peripheral surface of the second gear 113. However, hatchings on a section of the yoke 116 in FIG. 18 are omitted.

Projected portions of the yoke 116a and 116b are provided on the yoke 116 that are projected in the direction inside of a diameter of the yoke 116.

A support 117 is hanging from a base plate 120 in the direction of an axis, and the magnetic sensing element 115 is fixed to the lower end of the support 117. There are also provided a screw receiver 118 and a housing 119.

The housing 119 is consisting of a housing 119a at an upper end opening and a housing 119b at a lower end opening.

The upper end opening housing 119a and the lower end opening housing 119b constitute a sealed case.

A processing unit 121, which acts as a signal-processing unit in the present invention, is mounted on the base plate 120. A processing unit 121 is equivalent to the electronic circuit 100 shown in FIG. 1.

The rotating body 111 is penetrated through the housings 119a and 119b and a spiral screw surface is formed on an inner peripheral surface of the cylindrical screw receiver 118 with a cut away portion. The screw surface of the screw receiver 118 is engaged with the second gear 113. Similarly, the second gear 113 is engaged with the first gear 112.

Thereby, when the rotating body 111 and the first gear 112 rotate the second gear 113, the second gear 113 will be guided with the screw receiver 118, and will move in the direction of the axis.

Consequently, when the second gear 113 rotates while it moves in the direction of the axis by a rotation of the rotating body 111, both the pair of permanent magnets 114 and the yoke 116 rotate while move back and forth in the directions of the axis.

The magnetic field formed in the space inside of a diameter is continuously strengthened towards a lower part rather than an upper part in the direction of the axis by a unique shape and arrangement of a pair of permanent magnets 114 and the yoke 116 mentioned in the first embodiment.

For this reason, the magnetic sensing element 115 provided in the position of the axial center "M" of the second gear 113 can detect the rotation angle of the second gear 113 that exceeds 360 degrees.

FIG. 19 is a waveform chart showing the relation between the output of a pair of Hall devices, which constitute the magnetic sensing element 115, and the rotation angle of the rotating body 111.

A further explanation of the device composition and its operation of the present embodiment, except for the projected portions 116a and 116b of the yoke, is omitted since it is the same as that of the first embodiment.

An internal structure of the yoke 116 that makes the principal part of this rotation angle sensor is explained in more detail with reference to FIGS. 20A, 20B and 20C.

The section in the direction of the diameter inside the cylindrical yoke 116 is shown in FIG. 20A, and the axial cross-sections are shown in FIGS. 20B and 20C.

Further, FIG. 20B shows the section in alignment with the straight line that connects the middle positions of circumferences of projected portions 116a and 116b of the yoke 116, and FIG. 20C shows the section in alignment with the straight line that connects the middle positions of circumferences of the permanent magnets 114a and 114b.

The magnetic sensing element 115 is arranged on the axial center "M". The magnetic sensing element 115 integrates a pair of Hall elements therein that intersect orthogonally, and generate an output signal by responding to the magnetic field intensity in the direction of its diameter, respectively. However, the magnetic sensing element 115 is not shown in FIGS. 20A, 20B and 20C.

Of course, two magnetic sensing elements that integrate one magnetic sensing means respectively may be arranged in the axial center "M".

The section in the direction of the diameter of a pair of permanent magnets 114a and 114b formed in the shape of a cylinder with a cut away portion respectively makes the arc section by cutting the cylindrical magnet parallel to the axial center "M".

Bottom ends of the permanent magnets 114a and 114b in the direction of the axis are fixed to the inner peripheral surface of the yoke 16 in symmetry of rotation with an incli- nation posture that approaches the axial center "M" rather than top ends in the direction of the axis.

Thickness of the permanent magnets 114a and 114b is set to be constant.

The inner peripheral surface of the cylindrical yoke 116 with a cut away portion is formed as a tapered surface that sticks to the outside surface of the permanent magnets 114a and 114b as shown in FIG. 20C.

However, the inner peripheral surface of the yoke 116 is cylindrical as the part which does not touch the permanent magnets 114a and 114b as shown in FIG. 20B.

The permanent magnets 114a and 114b are magnetized in the direction of X-X as shown in FIG. 20A.

Consequently, the inner peripheral surfaces of a pair of permanent magnets 114a and 114b become opposite polar magnetic pole surfaces.

Specifically, the inner peripheral surface of the permanent magnet 116a becomes an N pole surface, and the inner peripheral surface of the permanent magnet 116b becomes an S pole surface.

The yoke 116 magnetically short-circuits the outer peripheral surface of a pair of permanent magnets 114a and 114b while it cuts off external magnetic field noise.

Figure 21A:
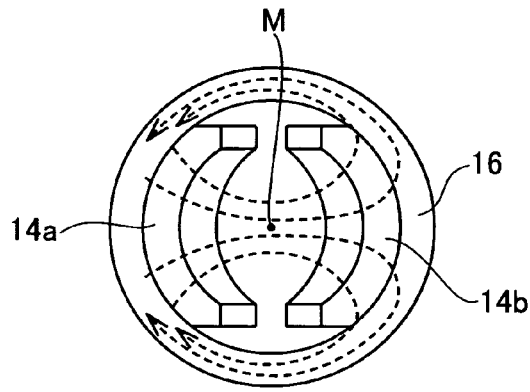
FIG. 21A is a sectional view in the direction of the diameter showing the effect of the magnetic flux distribution change of projected portions of the yoke, and this shows the case where projected portions of the yoke is not provided.
Figure 21B:
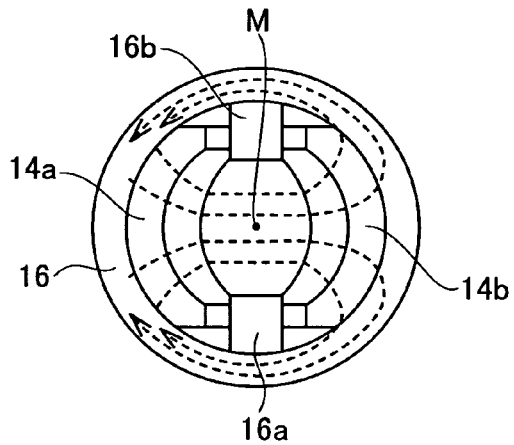
FIG. 21B is a sectional view in the direction of the diameter showing the effect of the magnetic flux distribution change of projected portions of the yoke, and this shows the case where projected portions of the yoke are provided.

Thereby, magnetic field in the direction of X-X is formed near the axial center "M" (refer to FIG. 21B).

Since the distance in the direction of X-X between the permanent magnet 114a and 114b differs, the magnetic field intensity in the direction of X-X in the axial center "M" falls continuously as it goes upwards.

(Projected Portions of the Yoke 116a and 116b)

The projected portions 116a and 116b that are featured in the present embodiment are explained.

The projected portions 116a and 116b are located between a pair of permanent magnets 114a and 114b, and projected towards the axial center "M" from the inner peripheral surface of the yoke 116 in the direction of Y-Y which is an orthogonal direction.

The projected portions 116a and 116b are mutually separated by 180 degrees and are provided in rotational symmetry. Tips of the projected portions 116a and 116b, shown in FIG. 20B, reach to the position near the axial center "M" rather than the adjoining inner peripheral surfaces of permanent magnets 114a and 114b.

As a result, as shown in FIG. 21B, in order that permanent magnets 114a and 114b absorb magnetic flux, the magnetic field near the axial center "M" will be pulled towards the projected portions 116a and 116b, and the direction of the magnetic field near the axial center "M" will be linearized in the direction of X-X compared with the direction of the magnetic field near the axial center "M" where there are no projected portions of the yoke 116a and 116b.

In addition, the flow of the magnetic flux where there are no projected portions of the yoke 116a and 116b formed is shown in FIG. 21A and the flow of the magnetic flux where there are projected portions of the yoke 116a and 116b formed is shown in FIG. 21B.

After all, according to the present embodiment, by adding the projected portions 116a and 116b that absorb a part of the magnetic flux, the direction of the magnetic field near the axial center "M" can be linearized in the direction of X-X, and the dispersion in magnetic intensity near the axial center "M" can be reduced.

MODIFICATION

Although the tips of the projected portions 116a and 116b of the present embodiment are made into planes that extend in parallel with the direction of X-X, and the axial center "M", a change in the form such as providing a taper or a rounding suitably may be given to the tips of the projected portions 116a and 116b.

Further, although the projected portions 116a and 116b of the present embodiment are projected cylindrically with square sections, they may be formed in tapered off towards the tip, for example.

In addition, although the width in the direction of the axis of the projected portions 116a and 116b shown in FIG. 20B is comparatively narrow, the width in the direction of the axis may be increased.

Figure 22:
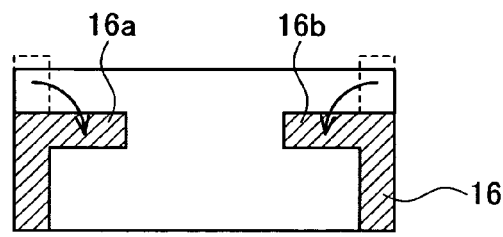
FIG. 22 shows a modification of the axial cross-sectional view of the yoke.

Furthermore, as shown in FIG. 22, some portions of the yoke 116 may be cut and bent to form the projected portions 116a and 116b.

Figure 23:
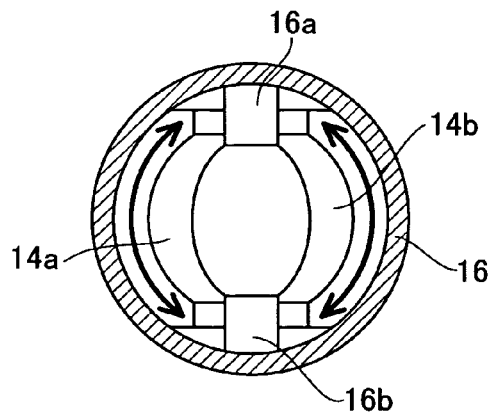
FIG. 23 is a schematic sectional view in the direction of the diameter showing the mode that uses the projected portions of the yoke for positioning of a permanent magnet.

Moreover, as shown in FIG. 23, the permanent magnets 114a and 114b may be fixed to the inner peripheral surface of the yoke 116 on the basis of the projected portions 116a and 116b. That is, the projected portions 116a and 116b may be used as a positioning member. In addition, the projected portions of the yoke of the yoke 116a and 116b are preferred to be formed in the yoke 116 integrally.

Since the pair of the projected portions 116a and 116b are arranged in symmetry of rotation will absorb the magnetic flux of the surroundings, and the magnetic flux near the axial center "M" will be pulled to the projected portions 116a and 116b side, the magnetic field near the axial center "M" can be made parallel as the result, thus the magnetic flux distribution can be equalized. Thereby, errors hardly occur even if the position of the magnetic sensing element shifts from the axial center "M". From the above, manufacturing and attaching the projected portions 116a and 116b can be performed easily.

The Effect of the Embodiment

According to the present embodiment, even if the magnetic sensing element 115 shifts in the direction of its diameter from the axial center position caused by the variation in manufacturing allowance, the change of magnetic field intensity that acts on the magnetic sensing element 115 can be reduced, thus the fall of detection accuracy can be prevented.

What is claimed is:

1. A rotation angle sensor comprising:
a gapped magnetic circuit that rotates around an axis-of-rotation while being concurrently moved in an axial direction interlocked with rotation of a rotating body;
a magnetic sensing element which detects a magnetic field along the axis-of-rotation being arranged at the axis-of-rotation of the gapped magnet circuit; and
a signal-processing unit that detects the number of rotations of the gapped magnet circuit by detecting an angle of rotation based on magnetic field direction detected by a signal from the magnetic sensing element;
the gapped magnetic circuit including a magnet that provides a magnetic field and a yoke for strengthening the magnetic field along the axis-of-rotation;
wherein the magnet is formed cylindrically from a pair of cylindrical magnets with cut away portions that are arranged facing each other and with the magnetic sensing element disposed therebetween;
inner peripheral surfaces of the pair of cylindrical magnets being arranged facing the magnetic sensing element and providing mutually opposite polar magnetic surfaces;
the yoke being made of a soft magnetic material in a pipe form arranged surrounding the pair of cylindrical magnets with cut away portions;
the yoke delivering and receiving the magnetic flux to and from outer peripheral surfaces of the pair of cylindrical magnets with cut away portions; and
the pair of cylindrical magnets with cut away portions being inclined to the axis of rotation such that one end is closer to the axis-of-rotation than the other.

2. The rotation angle sensor of claim 1,
wherein the pair of cylindrical magnets with cut away portions is formed of soft material and have a pair of projected portions that each project from an inner peripheral surface of the yoke towards openings between the pair of cylindrical magnets with cut away portions.

3. The rotation angle sensor of claim 2,
wherein the yoke is cut and bent to form the pair of projected portions.

4. A rotation angle sensor comprising:
a gapped magnetic circuit that rotates around an axis-of-rotation while being concurrently moved in an axial direction interlocked with rotation of a rotating body;
a magnetic sensing element which detects a magnetic field along the axis-of-rotation being arranged at the axis-of-rotation of the gapped magnet circuit; and
a signal-processing unit that detects the number of rotations of the gapped magnet circuit by detecting an angle of rotation based on magnetic field direction detected by a signal from the magnetic sensing element;
the gapped magnetic circuit including a magnet that provides a magnetic field and a yoke for strengthening the magnetic field along the axis-of-rotation;
wherein the magnet is formed cylindrically from a pair of cylindrical magnets with cut away portions that are arranged facing each other and with the magnetic sensing element disposed therebetween;
inner peripheral surfaces of the pair of cylindrical magnets being arranged facing, the magnetic sensing element and providing mutually opposite polar magnetic surfaces;
the yoke being made of a soft magnetic material in a pipe form arranged surrounding the pair of cylindrical magnets with cut away portions;
the yoke delivering and receiving the magnetic flux to and from outer peripheral surfaces of the pair of cylindrical magnets with cut away portions; and
an intensity of magnetic field along the axis-of-rotation of the magnet continuously changing along the axis-of-rotation by a changing magnetic reluctance of the gap provided between the outer peripheral surfaces of the pair of cylindrical magnets with cut away portions and the yoke.

5. The rotation angle sensor of claim 4,
wherein a gap provided between the outer peripheral surfaces of the pair of cylindrical magnets with cut away portions and the yoke continuously changes in a direction parallel to the axis-of-rotation.

6. A rotation angle sensor comprising:
a gapped magnetic circuit that rotates around an axis-of-rotation while being concurrently moved in an axial direction interlocked with rotation of a rotating body;
a magnetic sensing element which detects a magnetic field along the axis-of-rotation being arranged at the axis-of-rotation of the gapped magnet circuit; and
a signal-processing unit that detects the number of rotations of the gapped magnet circuit by detecting an angle of rotation based on magnetic field direction detected by a signal from the magnetic sensing element;

the gapped magnetic circuit including a magnet that provides a magnetic field and a yoke for strengthening the magnetic field along the axis-of-rotation;

wherein the magnet is formed cylindrically from a pair of cylindrical magnets with cut away portions that are arranged facing each other and with the magnetic sensing element disposed therebetween;

inner peripheral surfaces of the pair of cylindrical magnets being arranged facing the magnetic sensing element and providing mutually opposite polar magnetic surfaces;

the yoke being made of a soft magnetic material in a pipe form arranged surrounding the pair of cylindrical magnets with cut away portions;

the yoke delivering and receiving the magnetic flux to and from outer peripheral surfaces of the pair of cylindrical magnets with cut away portions; and wherein projected portions made of soft magnetic material are located between the pair of cylindrical magnets and project from the inner peripheral surface of the yoke inwardly toward its diameter, the projected portions are formed to provide a continuously changing magnetic field along the axis-of-rotation.

* * * * *